Figure 1:
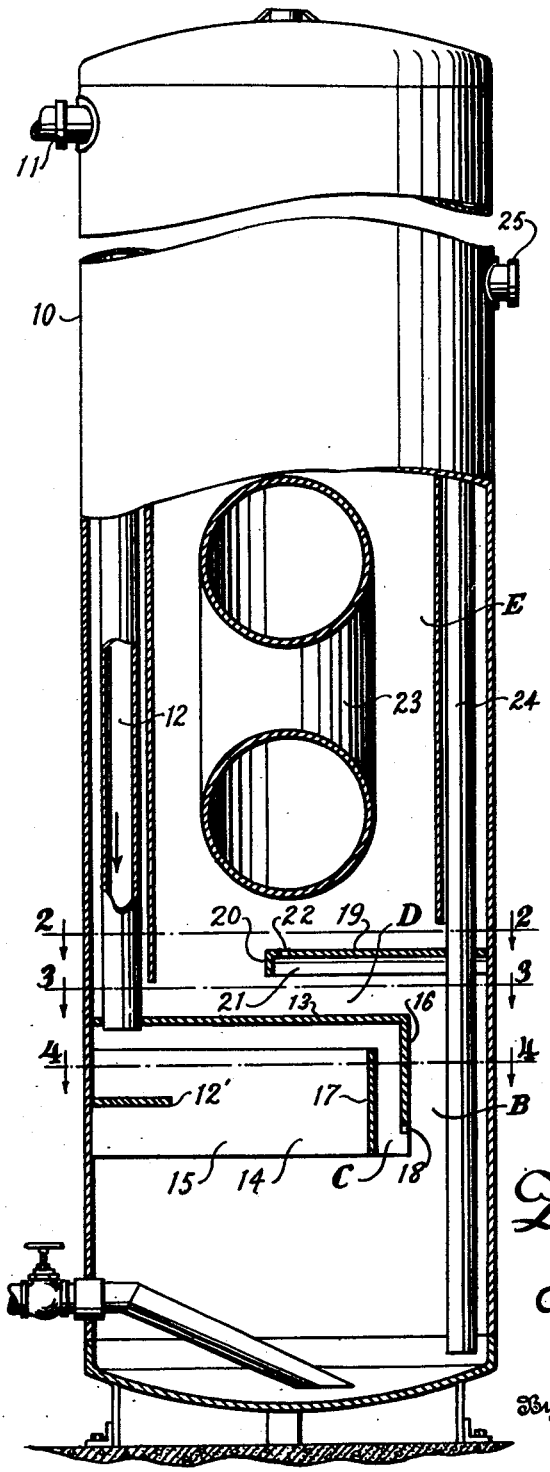

June 28, 1949.  C. O. GLASGOW  2,474,475

DEHYDRATOR

Filed May 14, 1945  3 Sheets-Sheet 1

Inventor
Clarence O. Glasgow

By Jack A. Ashley
Joseph H. Ashley
Attorneys

June 28, 1949.  C. O. GLASGOW  2,474,475
DEHYDRATOR
Filed May 14, 1945  3 Sheets-Sheet 2
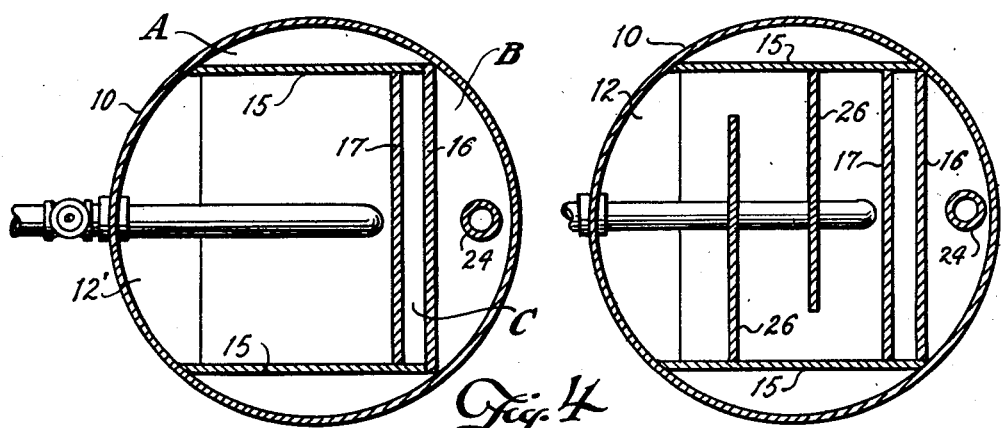
Fig. 4
Fig. 8
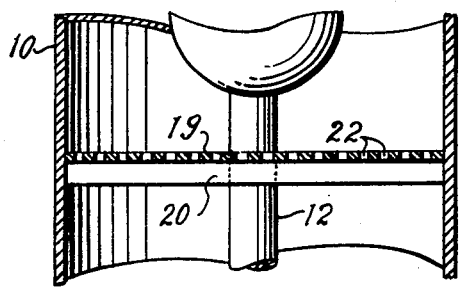
Fig. 5
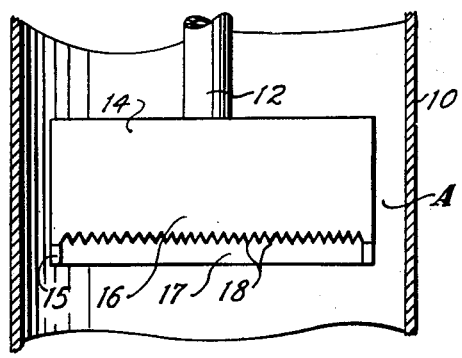
Fig. 7
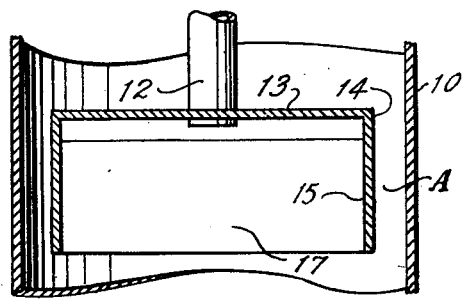
Fig. 6
Inventor
Clarence O. Glasgow
By Jack A. Ashley
Joseph H. Ashley
Attorneys

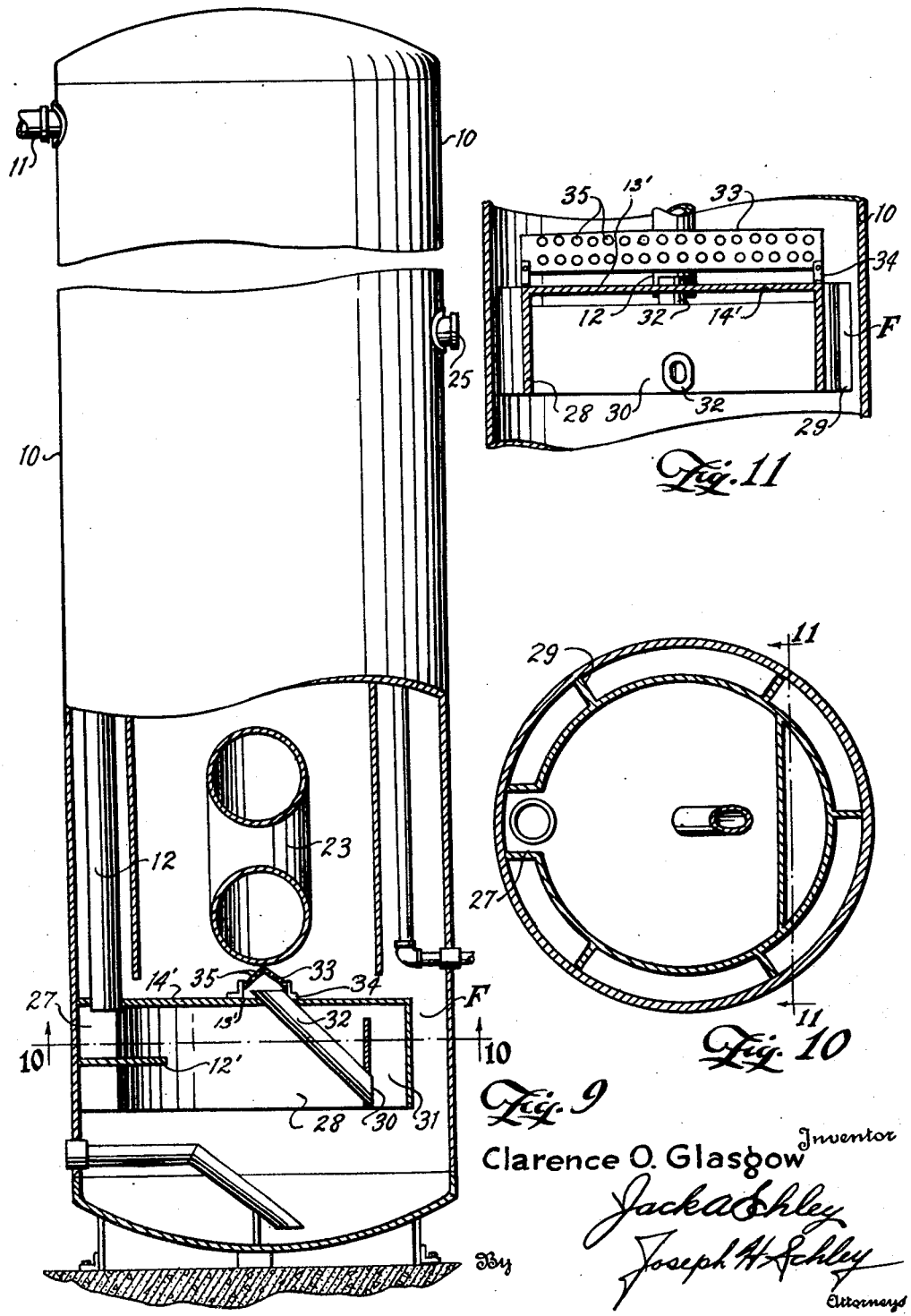

Patented June 28, 1949

2,474,475

UNITED STATES PATENT OFFICE 2,474,475

DEHYDRATOR

Clarence O. Glasgow, Tulsa, Okla., assignor to National Tank Company, Tulsa, Okla., a corporation of Nevada Application May 14, 1945, Serial No. 593,724

18 Claims. (Cl. 210—47)

1

This invention relates to new and useful improvements in dehydrators.

One object of the invention is to provide improved means in an oil-water emulsion treater, whereby the oil-water mixture is spread across the treater below the heating chamber and its direct flow sufficiently retarded to cause entrained water to drop out or precipitate, thus reducing the liquid load in said heating chamber and producing more desirable treating.

A further object of the invention is to provide improved spreading means, whereby the oil-water mixture is retarded and spread so that when the emulsion is introduced into the heating chamber, approximately all of the free water and some of the water content of the emulsion mixture, will have been dropped out or precipitated, which not only reduces the liquid and heat loads in the heating chamber, but increases the capacity of the heating chamber, produces more desirable treating and holds down the heating and treating costs.

Another object of the invention is to provide improved means, whereby the spread and baffled emulsified oil is delivered to the heating chamber below the heater thereof, in a multiplicity of small upwardly flowing streams dispersed across said chamber, so that the emulsified oil is more quickly and more uniformly heated; and better heat exchange with the heater is obtained, thereby dissipating excessive heat and prolonging the life of the heater.

Still another object of the invention is to provide an improved dehydrator wherein the oil-water mixture is spread, conducted across the tank and discharged into the heating chamber in such a manner as to take full advantage of heat exchange with the heated liquids in the lower portion of the heating chamber.

A still further object of the invention is to provide an improved apparatus wherein the oil-water mixture is caused to flow under horizontal plates or sheets at the bottom of the heating chamber so as to absorb heat from said plates or sheets which are themselves in heat exchange contact with the heated liquids in the heating chamber.

A construction designed to carry out the invention will be hereinafter described together with other features of the invention.

2

Figure 2:
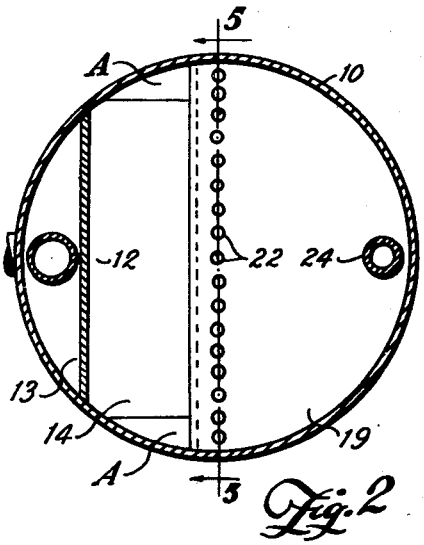
Figure 3:
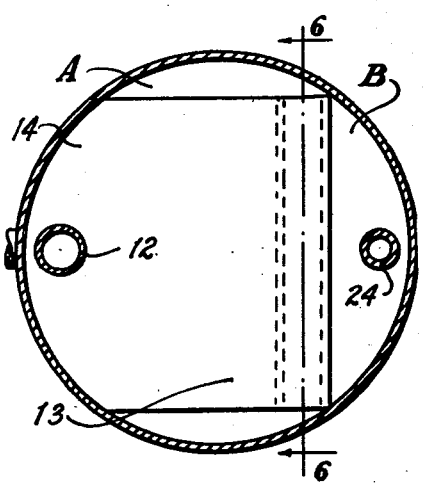

The invention will be more readily understood from a reading of the following specification and by reference to the accompanying drawings, wherein an example of the invention is shown, and wherein:

Fig. 1 is a view of an emulsion treater, partly in elevation and partly in section, equipped with an oil dehydrator constructed in accordance with the invention, Fig. 2 is a horizontal cross-sectional view taken on the line 2—2 of Fig. 1, Fig. 3 is a similar view taken on the line 3—3 of Fig. 1, Fig. 4 is a horizontal cross-sectional view taken on the line 4—4 of Fig. 1, Fig. 5 is a transverse sectional view of a portion of the treater taken on a line through the perforations of the upper partition, Fig. 6 is a transverse sectional view taken on a vertical plane across the treater between the upright baffles and looking toward the inner baffle, Fig. 7 is a transverse sectional view taken on a vertical plane across the treater looking toward the outer upright baffle, Fig. 8 is a view similar to Fig. 4 showing additional baffles in the hood, Fig. 9 is a vertical sectional view similar to the lower portion of Fig. 1 and showing another form of construction involving the invention, Fig. 10 is a horizontal cross-sectional view taken on the line 10—10 of Fig. 9, and Fig. 11 is a transverse sectional view taken on the line 11—11 of Fig. 9.

In the drawings, the numeral 10 designates a treater tank having an inlet 11 at its upper end, whereby the emulsion stream or oil-water mixture may be introduced. It is well known that considerable free water is entrained in the oil-water stream. In treaters of the character shown in the Jay P. Walker Patent No. 2,297,297, a large portion of this free water is separated in a separating chamber at the top of the tank, but in other treaters the influent stream is carried down within the tank and discharged at the lower end thereof. So far as the present invention is concerned, it makes no difference whether or not water is separated before being delivered to the bottom of the tank, because even if some free water is separated at the top of the tank or otherwise, an undesirable amount of free water will frequently be delivered with the emulsion, at the bottom of the tank; also, the invention involves precipitating some of the water emulsified with the oil, before the stream enters the heating chamber. In many installations it would not be necessary to separate water at the top of the tank.

A down pipe 12 is shown at one side of the tank and this pipe may extend directly from the inlet 11, from a gas separator at the top of the tank or from a water separator at the top of the tank or from any other source, so long as it delivers an oil-water stream to the lower end of the tank. The lower end of the pipe 12 extends through the flat top 13 of a hood or spreader 14 which extends from the wall adjacent said pipe, horizontally across the tank toward the opposite wall, as is best shown in Figs. 1, 3 and 4. The top 13 occupies a greater portion of the cross-sectional area of the tank. The hood is provided with depending upright side aprons or plates 15 and a transverse outer baffle or end plate 16. At the ends of the plate 16, the hood is secured to the inner wall of the tank and thus, there is provided at the sides of the hood, chordal flow spaces or passages A between the aprons 15 and the wall of the tank and a chordal flow space or passage B, between the end plate 16 and the wall of the tank.

The aprons 15 extend downwardly a substantial distance, but such extension may vary in accordance with the particular type of treater in which the invention is used. Spaced inwardly from the end plate 16, a transverse upright plate or inner baffle 17, is secured across the hood. The upper horizontal edge of this plate terminates a short distance below the top 13. Since the oil-water mixture is discharged by the pipe 12 into the hood and immediately under the top plate 13, and the tank being filled with liquid up to a medial height, the mixture will spread under said plate, whereby the emulsified oil, being of less specific gravity than the free water, will stratify and form a layer within and across the hood in intimate contact with the under side of the top plate 13.

Directly below the discharge end of the pipe 12, a horizontal deflector 12' is secured to the wall of the tank and has its ends attached to the aprons 15. Varying quantities of free water, depending upon the particular well streams being treated, will flow down the pipe 12 with the emulsified oil. The free water may be in larger quantities than the oil or the down stream may flow under considerable velocity or in such volume, as to cause the stream to take a general downward course. Free water would tend to flow toward the bottom of the tank. The deflector 12' will arrest a direct downward flow and aid in spreading the liquids across the tank.

The stratum of emulsified oil will be in constant motion and spreading toward the sides and end of the hood, but flowing generally toward the end plate 16. The baffle plates 16 and 17 form therebetween a relatively narrow transverse flume or passage C and as the stratum of emulsified oil builds up, it will flow over the top edge of the baffle 17 and then flow down the flume. This overflow may be controlled by varying the spacing of said edge from the top plate 13.

It will be observed that the lower edge of the plate 16 terminates short of the lower edges of the aprons 15 and thus, when the stratum of emulsified oil reaches a thickness where its bottom level goes below the level of the lower edge of the plate 16, then oil will flow from the flume C into the passage B and thence upwardly in said passage. The lower edge of the plate 16 also has the function of a weir. The baffles 16 and 17 constitute a means for collecting and maintaining a spreading and flowing stratum of emulsified oil of predetermined thickness within the hood, as well as means for retarding and baffling the flow of such oil. The lower edge of the plate 16 may be provided with serrations or saw teeth 18, whereby the outwardly flowing oil is divided into a transverse flow of small upwardly flowing streams, dispersed according to the spacing of said teeth. This treatment of the oil results in additional spreading thereof.

It is well known in oil field practice that if an oil-water mixture is spread over a large area between an inlet and an outlet, as for instance in a tank 30 or 40 feet in diameter, not only will the free water drop out of the mixture or precipitate therefrom, but the major portion of the water emulsified with the oil will separate from the oil. Such precipitation and/or separation will be accelerated and increased if heat is applied. However, it is more practical and economical to obtain the same results in a treater with a tank of from 4 to 10 feet in diameter. It is highly important to produce pipe line oil with a minimum water content for the reasons that oil with too high a water content is rejected by the pipe-line companies and the lower the percentage of water, the higher is the price paid.

There are many treaters which treat and deliver oil acceptable to the pipe-line companies; however, there is a proportionate expense in treating emulsified oils; such expense being governed by the heat load, the capacity of the heating chamber, the volume of oil treated in a given period, the rate of flow of the oil through the treater and supervision and maintenance. It is axiomatic that the more water removed from the oil-water mixture and/or the emulsified oil, the lighter becomes the oil stream delivered to the heating chamber, thus proportionately reducing the heat load, as well as increasing the treating capacity of the heater chamber, accelerating the flow of oil into and through such chamber and making the emulsion easier to break down in a given period of treatment. When water is removed, the specific gravity of the mixture and/or emulsion is reduced.

From the foregoing, it becomes obvious that by spreading and stratifying the oil-water mixture under the top 13 and in the hood 14, substantially any entrained free water will drop out and settle toward the bottom of the tank before the flow of liquids reaches the flume C. Since the liquids in the zone in which the hood is located will be more or less warm and also, since the emulsified oil will be widely spread and its flow retarded across the hood, much water will be precipitated from such oil and the latter thereby lightened. Consequently, the dehydrated oil will flow more rapidly up through the passage B than a heavier liquid.

Overhanging the space B and the hood 14 and also spaced thereabove, is a horizontal partition or baffle 19. This partition has a depending transverse flange 20 at its inner edge, slightly beyond the diametrical center of the tank, and also, is provided with a depending arcuate flange 21 connected to the ends of its flange 20. The flange 21 is secured to the inner surface of the tank wall. A transverse row of perforations 22 are formed in the partition contiguous to the flange 20 and on a line coincident with the diametrical axis of the tank. By the foregoing arrangement, there is formed a broad transverse channel D between the hood and the partition for conducting the flow from the passage B to the transverse central portion of the tank.

The emulsified oil escaping from the passage B will rise and flow under the partition toward the flange 20, where such flow will be arrested. The arrested oil will then flow upwardly through the perforations 22, whereby it will be divided into a multiplicity of small streams diametrically of the tank. Just above the perforations, a suitable heating element, such as a return bend heater tube 23 is disposed. This tube is supplied with heat in any suitable manner.

The top plate 13 of the hood 14 and the partition 19 form the bottom of a heating chamber E. Such chambers frequently have immersed baffles above the heater for washing the emulsified oil and thus terms heating and/or washing chambers are used. In the structure illustrated, the passage D forms both an entrance to and an outlet from the chamber for the passage of water; the flange 20 is adequate to arrest and cause the oil from the passage B to flow upwardly through the perforations 22 into the chamber. Since the tank will contain liquid, predominately water, from its bottom up to its medial portion well above the heater tube 23, the emulsified oil escaping from the flume C will flow upwardly and laterally through the water. The water in the tank, composed of the original body of water initially placed in the tank and augmented by the free salt water flowing thereinto and the salt water precipitated from the emulsion, will flow generally downward.

As the water moves downwardly in the tank it will become progressively cooler, therefore as the emulsified oil flows upwardly and laterally it consequently flows through increasingly hotter water from which it will absorb heat. This progressive heating of the emulsified oil will proportionately break down the emulsion and release water therefrom and such released water will settle back through the passage B and down onto the top plate 13. Where the lower edge of the plate 16 is provided with the serrations 18 and the upwardly flowing oil is thus divided into small streams, the oil will be more thoroughly heated and such streams flowing rapidly, there will be a reduced tendency to admix with descending water. Of course, the amount of water thus released will depend somewhat upon the velocity and volume of emulsified oil flowing upwardly.

Since the heater 23 is relatively close to the partition 19 and the top plate 13 of the hood 14, there will be, immediately above and in contact with the partition and top plate, a zone of hot water, whereby the said partition and top plate will be heated and will establish heat exchange relation between such hot water zone and the liquids flowing under these elements. Thus, the emulsified oil from the time it contacts the under side of the plate 13 until it enters the chamber E through the perforations 22, will be subjected to progressively increasing temperatures, which will result in a substantially continuous emulsion breaking operation. Attention is directed to the fact that the free water which discharges from the pipe 12 will immediately move toward the bottom of the tank because its temperature will be lower than the water contained in the zone into which it discharges. Such free water will not contact the plate 13 and therefore, it will not be heated sufficiently to defeat its downward movement.

The oil which is discharged through the perforations 22 having undergone a preliminary dehydration will have a lower percentage of water emulsified therewith and there will be substantially no free water entrained with such oil. The oil streams from said perforations impinge the rounded bottom of the heater tube 23 and flow upwardly in the chamber E, whereby such oil is heated and washed and the dehydration is completed. The emulsified oil entering the chamber E having a reduced specific gravity and a lower percentage of water, will be much easier to treat. The volume of liquid entering said chamber being much less than the volume of liquid entering the tank, the heat load in the chamber will be greatly reduced. With less liquid to be heated and treated in the chamber, in a given period, the capacity of the chamber is increased because the time lag through such chamber will not be as great as in the usual operation.

A water discharge pipe 24 extends from the bottom of the tank, upwardly through the passage B and partition 19 to an outlet 25, which may be connected with any suitable water leg or conductor (not shown). The water which is washed or precipitated from the emulsified oil in the chamber E tends to settle toward the bottom of the chamber or moves toward the wall of the tank, where it is more or less cooled and a downward circulation promoted. While some of the water will be recirculated in the chamber, much of it will settle onto the partition 19 and top plate 13. Such water will have a relatively high temperature, but not as high as the water immediately around the heater 23. This water will flow over the partition and discharge onto the top plate 13. Some of the water from the top plate will back flow through the passage D to the passage B, but the greater portion will flow into and down the passages A between the aprons 15 and the wall of the tank. Eventually such water settles to the bottom of the tank and is carried out through the pipe 24.

The invention may be carried out by other structures. In Fig. 8 intermeidate baffles in the form of staggered upright plates 26 attached to the under side of the top plate 13 and one of the aprons 15 of the hood 14, are shown. One or more of these baffles may be used. These baffles will cause the oil-water mixture to flow in a circuitous path from the down pipe 12 to the flume C. By thus elongating the flow path, an increased dehydration is provided.

In Figs. 9, 10 and 11, another form of structure is illustrated. In this form, the hood 14' assumes a circular or cylindrical form disposed concentrically in the tank so as to provide an annular water passage F therearound. This hood has a radial box 27 extending to the side wall of the tank and connected to the depending annular apron or plate 28 of the hood. The top of the box is flush with the horizontal top plate 13' of said hood. The down pipe 12 enters the box which is open to the hood owing to a gap in the apron 28. The hood is supported by radial gussets or webs 29 preferably welded to the tank wall and the apron 28. A baffle 30 comparable to the baffle 17, in the form of a transverse plate is secured across the hood and the emulsified oil flows over this plate into a passage 31.

From the lower central portion of the plate a flow tube or flume 32 inclines upwardly and passes through the center of the top plate 13' of the hood. This tube terminates immediately above the top plate and has its upper end cut off, substantially parallel to said plate. Immediately above and overhanging the tube is an elongated transverse spreader 33, suitably supported, as by legs 34 fastened on the top plate 29. This spreader is substantially V-shaped in cross-section and extends entirely across the hood and preferably has its ends open. Perforations 35 in the spreader divide the upwardly flowing oil into a multiplicity of small streams which impinge the under side of the heater tube 23; the spreader extending longitudinally under the tube. The baffles 26 may be applied to the hood 14'.

The operation is much the same as in Figs. 1 to 7. The oil-water mixture flows from the pipe 12 and spreads under the hood. The emulsified oil stratum overflows the baffle 30 into the passage 31, down the latter and into the lower end of the tube 32, from which it is discharged into the spreader 33. The lightened oil discharged in small streams from perforations 35 of the spreader, is heated and washed in the chamber E. The washed out water settles through the annular space F to the bottom of the tank.

In all forms, the oil-water mixture which is discharged from the down pipe 12 will be cooler than the body of liquids below the top plates of the hoods. Owing to the wide spreading action, the cooler free water entering the hood will readily precipitate, thus dropping out of the mixture. By the time the baffles 17 or 30 are reached, nearly all of the free water will have dropped out of the mixture and such water will settle to the bottom of the tank. Also owing to the fact that as the stratum of emulsified oil flows toward the outlet of the hood, in intimate contact with the plates 13 or 29, its temperature is gradually raised due to heat exchange with said plate and its contact with the warmer water within the hood, whereby varying amounts of water emulsified with the oil will be precipitated or washed out. Further, very little, if any, chilling is suffered by the oil during this flow due to descending water. Since the down pipe 12 is usually of ample size, as from 6 to 8 inches in diameter, any gas liberated under the hoods will by-pass the down-flowing liquids and escape upwardly through said pipe.

The term hood as used herein is intended to define a structure having a transverse top of considerable area in all diametrical directions and marginal structure depending from the top so as to confine a wide or broad stratum of emulsified oil thereunder.

What I claim and desire to secure by Letters Patent is:

1. In combination in an emulsion treater, a tank having a heating chamber therein, means for heating the liquids in the heating chamber, a transverse plate defining the bottom of the heating chamber, a conductor for delivering an oil-water mixture to the tank below the plate at one side of the tank, an oil outlet from the plate to the heating chamber for delivering oil to said chamber from below said plate spaced laterally of the tank from the conductor on the opposite side of the center of said tank, whereby the oil-water mixture is caused to flow generally laterally from said conductor to said outlet along the underside of said plate and spread in a broad stratum under said plate, means below said plate to divert the lateral flow of the liquids in advance of the outlet to permit water to precipitate from the oil-water mixture, and means for carrying off separated water from the tank.

2. The combination as set forth in claim 1, with means for separately conducting water settling in the heating chamber to a point in the tank below the discharge end of the conductor, whereby such settled water is segregated from the oil-water mixture discharged from the conductor.

3. An oil-water mixture dehydrating apparatus including, a tank having a heating chamber, means for heating liquids in the heating chamber, a hood extending laterally in said tank at the bottom of said chamber spaced above the bottom of the tank and having a wide top in heat exchange relation with said heating chamber, means for delivering an oil-water mixture under said hood, an oil outlet from said hood to said chamber spaced laterally across the tank from the delivery means, means within the hood at the outlet thereof for retarding the escape of liquid through said outlet, whereby the oil-water mixture is spread in said hood and the emulsified oil is stratified in intimate contact with the top of said hood to cause water to precipitate from the mixture under said hood, and means for carrying off separated water from the tank.

4. An oil-water mixture dehydrating apparatus as set forth in claim 3, and means for spreading the liquid escaping from said hood.

5. An oil-water mixture dehydrating apparatus as set forth in claim 3, and means for conducting settled water from the heating chamber to the bottom of the tank in a path segregated from the hood.

6. An oil-water mixture dehydrating apparatus including, a tank having a heating chamber, means for heating liquids in the heating chamber, a hood extending laterally in said tank at the bottom of said chamber spaced above the bottom of the tank and having a wide top in heat exchange relation with said chamber, means for delivering an oil-water mixture under said hood, an oil outlet from said hood to said chamber spaced laterally across the tank from the delivery means, means within the hood coacting with the outlet for overflowing emulsified oil stratified in the hood, means for conducting the overflowing oil upwardly to the heating chamber, and means for carrying off separated water from the tank.

7. An oil-water mixture dehydrating apparatus as set forth in claim 6, and means for dividing the overflowing oil into a multiplicity of streams transversely of the tank.

8. In combination in an emulsion treater, a tank having an elevated heating chamber, means for heating liquid in the heating chamber, a hood extending across the tank, a down pipe discharging into the hood for delivering an oil-water mixture thereinto, a transverse overflow baffle in the hood spaced across the tank from the down pipe to cause the oil to spread in a stratum across said tank, mean for conducting overflow oil from the lower portion of the hood to the heating chamber, and means for carrying off separated water from the tank.

9. In combination in an emulsion treater, a tank having an elevated heating chamber, means for heating liquid in the heating chamber, a hood extending across the tank, said hood having depending aprons spaced from the wall of the tank to provide segregated flow passages for water settling from the chamber, a down pipe discharging into the hood for delivering an oil-water mixture thereinto, a transverse overflow baffle in the hood spaced across the tank from the down pipe, means for conducting overflow oil from the lower portion of the hood to the chamber, and means for carrying off separated water from the tank.

10. In combination in an emulsion treater, a tank having an elevated heating chamber, means for heating liquid in the heating chamber, a hood extending across the tank, a down pipe discharging into the hood for delivering an oil-water mixture thereinto, a transverse overflow baffle in the hood spaced across the tank from the down pipe, an inclined conductor extending from the baffle upwardly through the top of the hood to the chamber for conducting oil to said chamber, and means for carrying off separated water from the tank.

11. The combination as set forth in claim 10, and a transverse spreader in the heating chamber immediately above said conductor.

12. In combination in an emulsion treater, a tank having an elevated heating chamber, means for heating liquid in the heating chamber, a hood extending across the tank, a down pipe discharging into the hood for delivering an oil-water mixture thereinto, a transverse overflow baffle in the hood spaced across the tank from the down pipe, a flume adjacent the overflow baffle for conducting and discharging overflow liquid from the hood, a passage for conducting the overflow oil upwardly, a partition overhanging the hood and the passage providing a channel for delivering the liquid from the passage to the chamber, and means for carrying off separated water from the tank.

13. In combination in an emulsion treater, a tank having an elevated heating chamber, means for heating liquid in the heating chamber, a hood extending across the tank, a down pipe discharging into the hood for delivering an oil-water mixture thereinto, a transverse overflow baffle in the hood spaced across the tank from the down pipe, a flume adjacent the overflow baffle for conducting and discharging overflow liquid from the hood, a passage for conducting the overflow oil upwardly, a partition overhanging the hood and the passage providing a channel for delivering the liquid from the passage to the chamber, means carried by the partition for dividing the liquid into a multiplicity of upwardly flowing streams, and means for carrying off separated water from the tank.

14. The method of treating emulsified oil streams which includes, flowing a stream having free water and emulsified oil entrained therein, spreading the stream in a broad confined area containing a body of heated water, stratifying the components of the stream in said area to cause the free water to settle downwardly and to preheat the stratum of emulsified oil, retarding the flow of the preheated stratum of emulsified oil for a period of time to cause water to precipitate therefrom, thereafter flowing the emulsified oil into a second confined area containing a body of heated water of higher temperature than the first body of water and separating water from the oil, and carrying off separated water.

15. The method of treating emulsified oil streams which includes, flowing a stream having free water and emulsified oil entrained therein, spreading the stream in a broad confined area containing a body of heated water, stratifying the components of the stream in said area to cause the free water to settle downwardly and to preheat the stratum of emulsified oil, retarding the flow of the preheated stratum of emulsified oil for a period of time to cause water to precipitate therefrom, thereafter flowing the emulsified oil into a second confined area containing a body of heated water of higher temperature than the first body of water and separating water from the oil, by-passing water separated in the second area with respect to the first area, and carrying off separated water.

16. The method of treating emulsified oil streams which includes, flowing the stream and spreading it in a broad confined horizontal area containing a body of heated water, reducing the velocity of the spreading stream to cause water to precipitate from the emulsified oil, collecting the emulsified oil in a stratum in said body of heated water for a period of time to preheat the stratum of emulsified oil and to cause water to precipitate therefrom, thereafter flowing the emulsified oil from said stratum into a second confined area containing a body of water of higher temperature than the first body of water and separating water from the oil, and carrying off separated water.

17. An oil-water mixture dehydrating apparatus including, a tank, a hood mounted across and within the tank having an inlet at one side and an outlet at the opposite side thereof, whereby the mixture is caused to spread across the tank, flow-obstructing means within the hood for stratifying a stratum of emulsified oil in said hood, a heating chamber in the tank, flow means for conducting emulsified oil from the outlet of the hood to the heating chamber, means for carrying off water separated in the hood, and spreader means for the conducted oil.

18. An oil-water mixture dehydrating apparatus as set forth in claim 17, with baffle means within the hood for baffling the oil-water mixture.

CLARENCE O. GLASGOW.

REFERENCES CITED

The following references are of record in the file of this patent:

UNITED STATES PATENTS

| Number | Name | Date |
| --- | --- | --- |
| Re. 20,227 | Gordon | Jan. 5, 1937 |
| 1,585,979 | Harrison | May 25, 1926 |
| 1,633,195 | Schwab et al. | June 21, 1927 |
| 2,165,703 | Holmes | July 11, 1939 |
| 2,167,160 | Raymond | July 25, 1939 |
| 2,179,131 | Millard | Nov. 7, 1939 |
| 2,181,684 | Walker | Nov. 28, 1939 |
| 2,232,948 | Ihrig et al. | Feb. 25, 1941 |
| 2,261,101 | Erwin | Oct. 28, 1941 |
| 2,297,297 | Walker | Sept. 29, 1942 |
| 2,342,950 | Lovelady et al. | Feb. 29, 1944 |
| 2,421,375 | Elliott | June 3, 1947 |